March 17, 1970  A. TANAKA  3,501,607
TWO-CONTACT LEAF SPRING WITH FULCRUM PORTION IN
A DOUBLE-POLE, DOUBLE-THROW SWITCH
Filed May 21, 1968
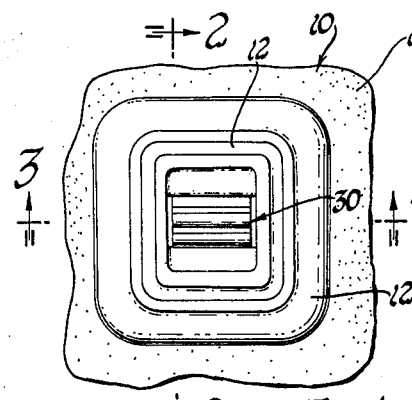
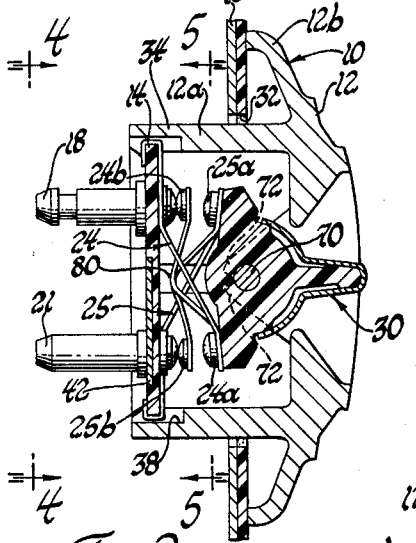
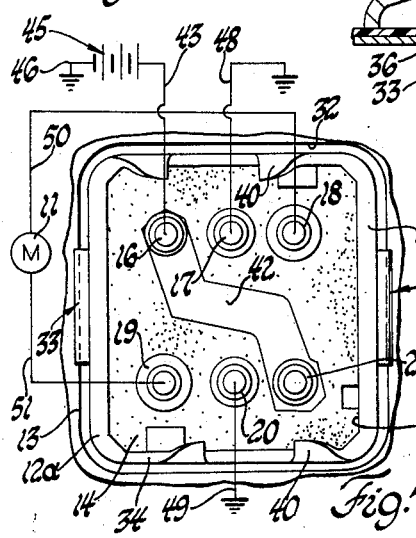
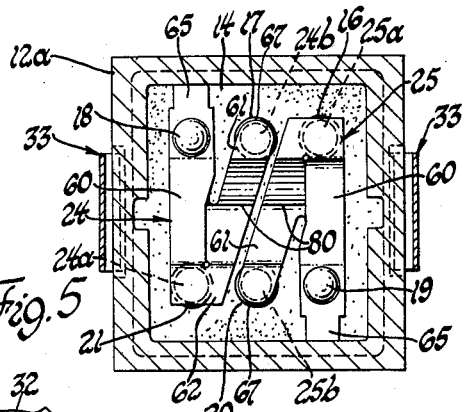
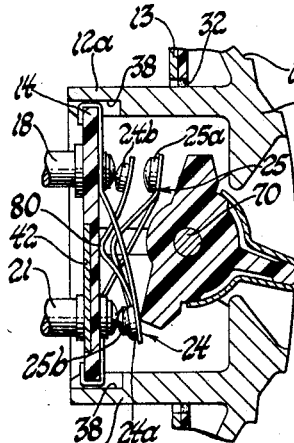
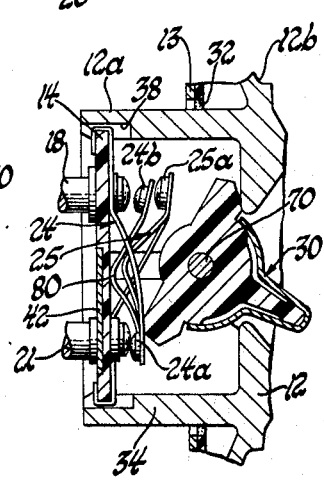
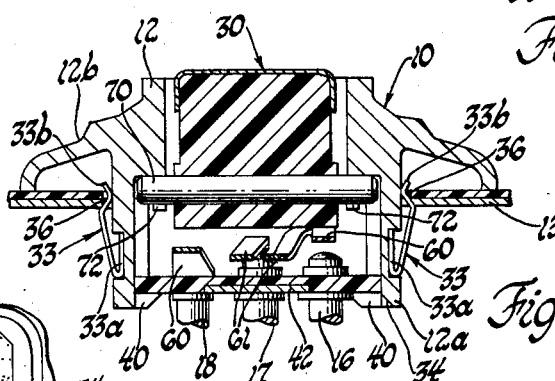
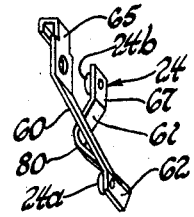
INVENTOR.
Akira Tanaka
BY
W. A. Schuetz
ATTORNEY 3,501,607
Patented Mar. 17, 1970

3,501,607
TWO-CONTACT LEAF SPRING WITH FULCRUM PORTION IN A DOUBLE-POLE, DOUBLE-THROW SWITCH
Akira Tanaka, Southfield, Mich., assignor to General Motors Corporation, Detroit, Mich., a corporation of Delaware
Filed May 21, 1968, Ser. No. 730,739
Int. Cl. H01h 21/24, 1/18
U.S. Cl. 200—153                          4 Claims

ABSTRACT OF THE DISCLOSURE

In a preferred form, this disclosure relates to a double pole, double throw electric switch which is particularly useful for controlling energization and the direction of rotation of a permanent magnet motor. The switch comprises a switch housing having a base at one end, a plurality of spaced stationary contacts carried by the base, an actuator supported by the housing for movement in opposite directions from a center position and a pair of leaf springs. The leaf springs are each fixed to a stationary contact connected to one end of the motor windings and are self-biased toward a normal position in which they biasingly hold the actuator in its center position and in which they each engage a stationary ground contact to normally provide a conductive path between the motor windings and ground. The actuator when moved in either direction from its center position causes one of the leaf springs to be deflected to disengage its associated ground contact and to engage an associated stationary contact connected to a power source to provide for current flow through the motor winding in a direction to produce the desired direction of rotation of the motor, the leaf springs including a fulcrum portion which engages the base when they are deflected to cause the adjacent portions to pivot thereabout and break the ground contact prior to engaging the contact connected to the power source.

---

The present invention relates to an electric switch, and in particular to a double pole, double throw electric switch which is especially useful for controlling energization and the direction of rotation of a permanent magnet motor.

The direction of rotation of a permanent magnet motor having a permanent field magnet or magnets can be reversed by reversing the direction of current flow through its armature windings. To effect this, electric switches have been provided which can be selectively operated to supply current from a source to either end of the armature windings and to break one or another ground path so that the current will flow through the armature windings to ground in a direction to cause the desired direction of rotation of the armature. These switches have generally included a switch housing having a base, a plurality of stationary contacts or terminals carried by the base, a manually manipulatable actuator supported by the switch housing for movement in opposite directions from a center position and mobile contact means movable in response to movement of the actuator to selectively engage and disengage respective stationary contacts to effect switching functions for producing the desired direction of rotation of the permanent magnet motor.

The present invention provides a new and improved electric switch which is of a simple, highly practical and economical construction, and which is particularly useful for carrying out the above noted switching functions for effecting a reversal of direction of rotation of a permanent magnet motor, such as the permanent magnet motors employed for moving various components of an automotive vehicle in opposite directions.

Accordingly, an object of the present invention is to provide a new and improved electric switch which is of a simple, highly practical and economical construction and which is especially useful for controlling energization and the direction of rotation of a permanent magnet motor.

Another object of the present invention is to provide a new and improved electric switch of the character referred to above and in which the mobile contact means comprises mobile contact carriers connected to stationary contacts which are adapted to be connected with the motor windings and which are biased toward a normal position in which they engage the actuator to biasingly hold the same in its center position and engage associated stationary ground contacts to provide a conductive path therethrough between one end of the motor winding and ground and in which they are disengaged from associated contacts connected with a power source, and wherein the actuator when moved in either direction from its center position causes one of the contact carriers to be moved to disengage its associated stationary ground contact and to engage its associated stationary contact connected with the power source to provide for current flow through the motor windings in a direction to produce the desired direction of rotation of the motor, and wherein the contact carriers include lever portions having a fulcrum which is engageable with the base and about which the contact carrier pivots as it is moved so that the contact carrier first disengages its associated stationary ground contact prior to engaging its associated stationary contact connected with the power souce.

Yet another object of the present invention is to provide a new and improved electric switch, as defined in the next preceding object, and wherein the contact carriers are in the form of leaf springs having a construction and arrangement such that when they are deflected or moved their contact surface in engagement with the associated ground contact rolls on the latter contact until the fulcrum of the lever portion engages the base whereupon the contact surface is rapidly moved away from the associated ground contact whereby pitting and corrosion of the contact surfaces is eliminated or minimized.

A further object o fthe present invention is to provide a new and improved electric switch having mobile contact carriers in the form of leaf springs which are biased to a normal position in which they biasingly hold an actuator in its center position and in which the leaf springs bridge first and second associated stationary contacts to provide a conductive path therebetween, and in which the leaf springs are so constructed and arranged that when moved in response to movement of the actuator they cooperate with the base carrying the associated stationary contacts to first disengage from the second associated stationary contacts to interrupt the conductive path between the first and second stationary contacts prior to engaging a third associated stationary contact to provide a conductive path between the first and third contacts.

Yet another object of the present invention is to provide a new and improved electric switch, as defined in the next preceding object, and in which the leaf springs each have a lever portion defining a fulcrum, and in which the fulcrums of the lever portions engage the base when the leaf springs are moved to cause the same to pivot about their fulcrum and to first disengage from their second associated stationary contact and then engage their third associated stationary contact.

The present invention further resides in various novel constructions and arrangement of parts, and further objects, novel characteristics and advantages of the present invention will be apparent to those skilled in the art to which it relates and from the following detailed description of the preferred, illustrated embodiment thereof made with reference to the accompanying drawings forming a part of this specification, and in which similar reference numerals or characters are employed to designate corresponding parts throughout the several views, and in which:

FIGURE 1 is a plan view of an electric switch embodying the present invention, and showing the same mounted on a panel;

FIGURE 2 is a cross-sectional view taken approximately along line 2—2 of FIGURE 1;

FIGURE 3 is a cross-sectional view taken approximately along line 3—3 of FIGURE 1;

FIGURE 4 is a bottom plan view of the electric switch looking in the direction of the arrows 4—4 of FIGURE 2, and schematically showing a circuit for electrically interconnecting the electric switch with a permanent magnet motor;

FIGURE 5 is a cross-sectional view taken approximately along line 5—5 of FIGURE 2;

FIGURES 6 and 7 are fragmentary sectional views like that shown in FIGURE 2, but showing different parts thereof in different relative positions; and FIGURE 8 is a perspective view of part of the electric switch shown in FIGURE 1.

The present invention provides a novel electric switch or circuit controller, and in particular provides a novel double pole, double throw electric switch. Although the novel electric switch of the present invention could be employed in various applications, it is particularly susceptible for use in controlling energization and the direction of rotation of a reversible permanent magnet motor for operating a component of an automotive vehicle, such as a window regulator mechanism for raising and lowering a window of the automotive vehicle, and therefore, for the purposes of description, the switch will be herein described as being used for the latter purpose.

As representing a preferred embodiment of the present invention, the drawings show an electric switch 10 for use in controlling the direction of rotation of a reversible permanent magnet motor 11 for operating a window regulator mechanism (not shown) for raising and lowering a window of an automotive vehicle. Since the window regulator mechanism can be of any suitable or conventional construction and since it does not, per se, form a part of the present invention, it has not been shown in the drawings and will not be described in detail.

The electric switch 10 broadly comprises an escutcheon or switch housing 12 which is adapted to be detachably mounted on a suitable panel, such as an interior door panel 13 of the automotive vehicle, a base or base member 14 carried by the escutcheon 12, a plurality of spaced stationary contacts or terminals 16–21 carried by the base 14, a pair of mobile contact carriers 24 and 25 in the form of leaf springs having mobile contacts or contact surfaces 24a and 24b and 25a and 25b, respectively, and a manually manipulatable actuator 30 pivotally connected to the switch housing 12 and which is biased toward a center or neutral position, as shown in FIGURE 2, by the leaf springs 24 and 25. The actuator 30 is manually movable in opposite directions from its center position to deflect one or the other of the leaf springs 24 and 25 to cause the mobile contacts carried thereby to disengage and engage associated stationary contacts to selectively effect switching functions for producing the desired direction of rotation of the motor 11.

The switch housing 12 comprises an open ended housing portion 12a which is of a generally rectangular configuration and a rectangularly shaped decorative flange portion 12b surrounding the housing portion 12a at one end thereof. The generally rectangularly shaped housing portion 12a is adapted to be inserted through a complementary shaped opening 32 in the interior door panel 13 and with the decorative flange portion 12b being positioned against the side of the door panel 13 facing interiorly of the vehicle.

The switch housing 12 is detachably mounted on the interior door panel 13 by a pair of springs 33 (see FIGURE 3) carried by the housing portion 12a. The springs 33 have an inner end portion 33a which is suitably secured to the inner end 34 of the housing portion 12a and an outer flexible free end portion 33b. The transverse distance between the free end portions 33b when free of any externally imposed forces is greater than the transverse dimension of the opening 32 in the panel 13 and the outer free end portions 33b have tapered shoulders 36 extending inwardly toward the housing portion 12a.

The switch housing 12 is mounted on the door panel 13 by inserting the inner end 34 of the housing portion 12a through the opening 32 until the flange portion 12b engages the door panel 13. As the housing portion 12a is inserted through the opening 32, the free end portions 33b of the springs 33 are deflected inwardly toward the housing portion 12a by the side wall of the panel 13 defining the opening 32 until the tapered shoulders 36 are aligned with the side wall of the panel 13. When this alignment occurs, the free end portions 33b flex outwardly relative to the housing portion 12a to position the shoulders 36 behind the panel 13. The switch housing 12 is securely retained on the panel 13 as a result of the flange portion 12b and the shoulders 36 of the springs 33 engaging the opposite sides of the panel 13.

The base member 14, in the preferred embodiment, is a separate member and is carried by the housing portion 12a at its inner end 34 and extends transversely thereof. The base 14 is of a generally rectangular shape and is slidably received within a complementary shaped central opening 38 in the housing portion 12a. The base 14 is retained within the housing portion 12a as a result of the latter at its inner end 34 being staked or peened inwardly, as indicated by reference numeral 40 in FIGURE 4, at spaced peripheral locations and beneath the outer bottom side of the base member 14. The base 14 is made from a suitable electrically insulated material and carries the stationary terminals 16–21.

The terminals 16–18 and 19–21 comprise first and second spaced sets of terminals, respectively. As best shown in FIGURE 4, the terminals 16 and 21 are fixed to and interconnected by a conductor strip 42 extending along the outer bottom side of the base and with the terminal 16 in turn being electrically connected via a lead wire or conductor 43 to the positive terminal of a battery 45. The negative terminal of the battery is connected to a suitable ground by a lead wire or conductor 46. Terminals 17 and 20 are respectively connected to a suitable ground via lead wires or conductors 48 and 49. Terminals 18 and 19 are respectively connected via lead wires 50 and 51 to the opposite ends of the armature windings of the permanent magnet motor 11, which can be of any suitable or conventional construction. Each of the terminals 16 through 21 has a convex end portion which is disposed interiorly of the housing 12a to provide a stationary contact surface.

The base 14 also supports the leaf springs 24 and 25, the leaf springs being supported at spaced locations on the base 14. Since both leaf springs 24 and 25 are of an identical construction, only the leaf spring 24 will be described in detail and corresponding parts of the leaf spring 25, except for the mobile contacts 25a and 25b, will be given the same reference numerals.

The leaf spring 24 is a one piece member and is generally V-shaped, as viewed in plan in FIGURE 5. The leaf spring 24 comprises first and second legs 60 and 61 which are integrally joined at one end to a bridging portion 62. The leg 60 extends generally parallel to one of the side walls of the housing portion 12a and adjacent its end 65 remote from the bridging portion 62 is fixed to the terminal 18. The leg 60 extends in a direction away from the base 14 proceeding from its end 65 toward the bridging portion 62, the bridging portion 62 and the second leg 61 being free. The mobile contacts 24a and 24b are convex and respectively carried on the underside of the bridging portion 62 and the other end 67 of the second leg 61. The leg 60 of leaf spring 25 is fixed to the terminal 19.

The leaf springs 24 and 25 are self-biased toward a first or normal position in which the bridging portions 62 thereof engage the underside of the actuator 30 to bias the latter towards its center position, as shown in FIGURE 2. When in this position, the mobile contacts 24b and 25b carried by the second leg 61 of the leaf springs 24 and 25 are in engagement with their associated ground terminals 17 and 20 and the mobile contacts 24a and 25a are spaced from their associated power terminals 21 and 16, respectively.

The actuator 30 which is biased to its center position, as shown in FIGURE 2, by the leaf springs 24 and 25 is pivotally connected to the switch housing 12 via a pivot pin 70. As best shown in FIGURES 2 and 3, the pivot pin means 70 is rigidly secured to the actuator 30 and is pivotally supported at its opposite ends by downwardly extending projections 72 on the switch housing 12 and which are bent so as to extend underneath and support the pivot pin 70.

When the actuator 30 is in its center position and the leaf springs 24 and 25 are in their first position, as shown in FIGURE 2, the permanent magnet motor 11 is de-energized. This is because in this position, the mobile contacts 24a and 25a are spaced from their associated power terminals 21 and 16 which are electrically connected with the battery 45.

The permanent magnet motor 11 can be rotated in first and second opposite directions to actuate the window regulator mechanism (not shown) to raise and lower the window of the vehicle by respectively manually moving or pivoting the actuator 30 upwardly and downwardly from its center position, as shown in FIGURE 2. Assuming that it is desired to lower the window, the operator would pivot the actuator 30 from its center position, as shown in FIGURE 2, in a downward direction toward the position shown in FIGURE 7. When the actuator 30 is pivoted in this direction it causes the leaf spring 24 to be deflected or moved toward the base 14 toward its second position, as shown in FIGURE 7. When in this position the mobile contact 24b is disengaged from its associated ground terminal 17 and the mobile contact 24a is in engagement with its associated power terminal 21.

The disengagement of the mobile contact 24b from its associated ground terminal 17 breaks the conductive path through the leaf spring 24 between the armature winding of the motor 11 and the ground terminal 17. The engagement of mobile contact 24a with the power terminal 21 completes a circuit through the armature winding to ground which causes the motor 11 to be rotated in the desired direction to effect a lowering of the window. This circuit is from battery 45, wire 43, power terminal 16, conductor strip 42, power terminal 21, leaf spring 24, motor terminal 18, wire 50, through the armature winding of the motor 11, wire 51, motor terminal 19, leaf springs 25, ground contact 20, wire 49 to ground.

When the window has been lowered the desired amount, the operator will release the actuator 30 and the leaf spring 24 will cause the actuator 30 to be returned to its center position, as shown in FIGURE 2. As the actuator is returned toward its center position, the mobile contact 24a will disengage the power terminal 21 to break the circuit to the motor 11 and the mobile contact 24b will re-engage its associated ground terminal 17 to bridge the terminals 17 and 18.

If it is desired to raise the window the operator would move the actuator button 30 upwardly from its center position, as shown in FIGURE 2. This movement will cause the leaf spring 25 to be deflected toward the base 14, which in turn will cause the mobile contact 25b to disengage its associated ground terminal 20 to break the conductive path through leaf spring 25 between terminal 19 and ground terminal 20 and the mobile contact 25a to engage power terminal 16. When mobile contact engages power terminal 16, current is caused to flow through the armature windings in the opposite direction, which in turn will cause the motor 11 to rotate in the opposite direction to raise the window of the vehicle. This current flow is from battery 45, wire 43, power terminal 16, power terminal 21, mobile contact 25a, leaf spring 25, motor terminal 19, wire 51, through the armature windings, wire 50, motor terminal 18, leaf spring 24, mobile contact 24b, ground terminal 27, wire 48 to ground.

An important feature of the present invention is that the contact carriers or leaf springs 24 and 25 are constructed such that when deflected toward the base 14 by the actuator 30 they first disengage their respective associated ground terminals prior to engaging their associated power terminals. To this end, the other legs 61 of the leaf springs 24 and 25 are in the form of levers or lever portions. The levers 61 are generally V-shaped, as viewed in side elevation, so as to define a fulcrum 80 intermediate their ends 62 and 67. When the leaf springs 24 and 25 are in their first or normal position, the fulcrums 80 thereof are spaced from the base 14, as shown in FIGURE 2.

However, when the actuator 30 is pivoted from its center position in a downward direction to cause the leaf spring 24 to be deflected toward the base 14, the fulcrum 80 of the lever 61 also moves toward the base 14 while the mobile contact 24b carried at its end 67 remains in engagement with its associated ground contact 27. When the fulcrum 80 engages the base 14, as shown in FIGURE 6, further deflecting movement of the leg 60 of the leaf spring 24 toward the base 14 causes the lever 61 to pivot about the fulcrum 80 and rapidly move the mobile contact 24b out of engagement with its associated ground terminal 17 prior to the mobile contact 24a engaging its associated power terminal 21. The leaf spring 25 functions in the same manner as the leaf spring 24 when the actuator 30 is pivoted in an upward direction from its center position.

The advantages of the above noted leaf spring construction and arrangement are that it insures that its associated ground terminal is disengaged prior to its associated power contact being engaged so that only the proper ground path (through the other leaf spring) for effecting the desired direction of rotation of the motor is provided prior to the motor 11 being energized. Another advantage is that the mobile contacts on the levers 61 roll on their associated ground terminals until the fulcrum 80 of the levers engage the base 14. This rolling action between the convex contact surfaces of the mobile contacts 24b and 25b and ground terminals 17 and 20 minimize pitting and corrosion buildup on the contact surfaces. Also when the mobile contacts 24a and 25a engage their associated power terminals 21 and 16 further movement of the leaf springs and actuator 30 is prevented so as to give the operator a clear indication or feel that the switching functions have been carried out.

Although the illustrated, preferred embodiment hereof has been described in great detail, it should be apparent that certain modifications, changes, and adaptations may be made therein, and that it is intended to cover all such modifications, changes and adaptations which come within the scope of the invention.

What is claimed is:

1. An electric switch comprising: a switch housing having a transversely extending base adjacent one end thereof; a plurality of spaced fixed contacts carried by said base; an actuator spaced from said base and supported by said switch housing for movement relative thereto in opposite directions from a center position; first and second spaced leaf springs supported by said base, said leaf springs each having laterally spaced legs which are integrally joined at one end by a bridging portion, one of said legs of each of said leaf springs at its other end remote from the bridging portion being fixed to a stationary contact and extending away from said base proceeding from its other end toward said one end, said bridging portion and the other leg of said leaf springs being free, said leaf springs at their bridging portion and at the ends of said other legs remote from said bridging portion having first and second contact surfaces, respectively, said leaf springs being self-biased toward a first position in which the bridging portions thereof are engageable with the actuator to biasingly hold the same in its center position and in which the first and second contact surfaces thereon are respectively engaged with and disengaged from associated stationary contacts, said first and second leaf springs being deflectable from their first position toward a second position in opposition to their self-biasing forces in response to movement of said actuator in first and second directions from its centered position, said first and second contact surfaces of said first and second leaf springs when the latter are in their second positions having their first contact surface disengaged from its associated stationary contact and their second contact surface engaged with its associated stationary contact, said other leg of said leaf springs being generally V-shaped, as viewed in side elevation, to define a fulcrum portion intermediate its ends which is engageable with the base as the leaf spring is moved toward its second position and which causes the other leg to pivot about its fulcrum to first move the first contact surface out of engagement with its associated stationary contact prior to the second contact surface engaging its associated stationary contact.

2. An electric switch as defined in claim 1 wherein said leaf springs are generally V-shaped, as viewed in plan.

3. A double pole, double throw switch assembly for controlling energization and the direction of rotation of a permanent magnet motor comprising: a switch housing having a transversely extending base adjacent one end thereof, first and second spaced sets of staitonary contacts and with one of the contacts of each of said sets being adapted to be connected to ground, a second of each set being adapted to be connected to a power source, and a third of each set being adapted to be connected to one end of the motor windings, a manually manipulatable actuator spaced from said base and supported by said switch housing for movement in opposite directions from a center position, first and second mobile contact carriers supported by said base and respectively connected with said first contacts of said first and second sets of stationary contacts, said mobile contact carriers being biased toward a first position in which they are engageable with the actuator to biasingly hold the same in its center position and in which they are respectively engaged with the second stationary contact of the first and second sets of contacts and disengaged from the first stationary contacts of said second and first sets of contacts, said actuator when moved in first and second directions from its center position respectively causing said first and second contact carriers to be moved from their first position toward a second position in which they are disengaged from their associated second stationary contacts to break the ground path therethrough and to engage their associated first contacts to direct the flow of current through the motor windings in first and second directions to cause the motor to rotate in first and second opposite directions, said contact carriers each including a portion defining a fulcrum which is engageable with the base as the respective contact carrier is moved toward its second position to cause adjacent portion of the contact carrier to pivot thereabout so that the contact carrier first disengages its associated second stationary contact prior to engaging its associated first stationary contact.

4. A double pole, double throw switch assembly for controlling energization and the direction of rotation of an armature of a permanent magnet motor comprising: a switch housing having a transversely extending base adjacent one end thereof, first and second spaced sets of stationary contacts and with one of the contacts of each of said sets being adapted to be connected to ground, a second of each set being adapted to be connected to a power source, and a third of each set being adapted to be respectively connected to the opposite ends of the armature windings, a manually manipulatable actuator spaced from said base and pivotally supported by said housing for movement in opposite directions from a center position, first and second leaf springs supported by said base, said leaf springs having laterally spaced legs which are integrally joined at one end by a bridging portion, the other end of one of said legs of said first and second leaf springs being respectively fixed to said third stationary contact of said first and second sets of stationary contacts, said one leg of each of said leaf springs extending away from said base proceeding from its other end toward said one end and with said bridging portion and the other leg of said leaf springs being free, said leaf springs at their bridging portion and at the other end of the other leg having first and second contact surfaces, respectively, said first and second leaf springs being biased toward a first position in which the bridging portions thereof are engageable with the actuator to biasingly hold the same in its center position and in which the first contact surfaces thereof are respectively engaged with said first stationary contacts of said first and second sets of stationary contacts and said second contact surfaces are spaced from the second stationary contacts of said second and first sets of contacts, respectively, said actuator when moved in first and second directions from its center position causing said first and second leaf springs to be moved from their first position in opposition to their self-biasing forces toward a second position in which the first contact surface is disengaged from its associated first stationary contact and the second contact surface engages its associated third stationary contact, respectively, said other leg of said leaf spring being generally V-shaped, as viewed in side elevation, to define a fulcrum portion intermediate its ends which is engageable with the base as said leaf spring is moved toward its second position, said fulcrum portion when in engagement with the base causing said other leg to pivot thereabout to first move the first contact surface out of engagement with is associated first stationary contact to break a path to ground through the leaf spring being moved prior to the second mobile contact engaging its associated third stationary contact to cause current to flow in one direction through the armature windings.

References Cited

UNITED STATES PATENTS

| | | |
|---|---|---|
| 2,630,504 | 3/1953 | Burch et al. |
| 2,815,501 | 12/1957 | Benson et al. |
| 3,359,515 | 12/1967 | Thatcher. |
| 3,433,908 | 3/1969 | Cunningham. |

FOREIGN PATENTS 1,274,177  11/1960  France.

ROBERT S. MACON, Primary Examiner

R. A. VANDERHYE, Assistant Examiner

U.S. Cl. X.R.

200—6, 164, 166